(12) United States Patent
Chauveau et al.

(10) Patent No.: US 6,540,354 B2
(45) Date of Patent: *Apr. 1, 2003

(54) MULTIFOCAL OPHTHALMIC LENS

(75) Inventors: Jean-Pierre Chauveau, Paris (FR); Bernard Bourdoncle, Paris (FR); Sandrine Francois, Paris (FR)

(73) Assignee: Essilor International, Charenten (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/389,762

(22) Filed: Sep. 2, 1999

(65) Prior Publication Data

US 2002/0001061 A1 Jan. 3, 2002

Related U.S. Application Data

(63) Continuation-in-part of application No. 09/118,723, filed on Jul. 17, 1998, now abandoned.

(30) Foreign Application Priority Data

Oct. 16, 1997 (FR) .............................. 97 12989

(51) Int. Cl.⁷ ................................................ G02C 7/06
(52) U.S. Cl. ..................................................... 351/169
(58) Field of Search ................................. 351/169, 168, 351/170–172, 176

(56) References Cited

U.S. PATENT DOCUMENTS

| 4,854,689 | A |   | 8/1989  | Dufour et al. ............... 351/169 |
| 5,270,745 | A |   | 12/1993 | Pedrono ...................... 351/169 |
| 5,488,442 | A |   | 1/1996  | Harsigny et al. ........... 351/169 |
| 5,719,658 | A |   | 2/1998  | Ahsbahs et al. ............ 351/169 |
| 6,102,544 | A | * | 8/2000  | Baudart et la. ............. 351/169 |

OTHER PUBLICATIONS

Guilino, Applied Optics, "Design Philosophy for Progressive Addition Lenses," 32:1:111–117, Jan. 1, 1993.

"Essilor Delta: Lenses for the Proximal Field Too," Opticien Lunetier, Apr. 1988. (Translation attached).

* cited by examiner

Primary Examiner—Jordan M. Schwartz
(74) Attorney, Agent, or Firm—Fish & Richardson P.C.

(57) ABSTRACT

A multifocal ophthalmic lens comprising a far vision region, a near vision region an intermediate vision region and a main meridian of progression passing through these three regions is provided in which a principal length of progression, defined as a ratio between power addition and maximum slope of mean sphere along the meridian is less than 16 mm, sphere varies in a monotonous fashion as a function of angle on a 20 mm radius circle centered on a geometric center of the lens at both sides of said meridian, and in which the far vision region includes an angular sector having its origin at the geometric center of the lens with an included angle greater than 150°. This provides a good distribution of isocylinder and ionosphere lines over the lens, ensuring progression is very gentle.

28 Claims, 7 Drawing Sheets

MULTIFOCAL OPHTHALMIC LENS

This application is a continuation-in-part of U.S. patent application Ser. No. 09/118,723, filed Jul. 17, 1998 now abandoned.

BACKGROUND OF THE INVENTION

The present invention relates to a multifocal ophthalmic lens, having an aspherical surface which has a mean sphere and a cylinder at every point thereon.

Such lenses are well known; among multifocal lenses one can distinguish lenses known as progressive lenses adapted to vision at all distances, and lenses that are more specifically dedicated to near vision and intermediate vision.

Progressive multifocal ophthalmic lenses comprise a far vision region, a near vision region, an intermediate vision region, and a main meridian of progression passing through the three regions. French patent application 2,699,294, which is incorporated herein by reference, describes, in its preamble, the various elements of a progressive multifocal ophthalmic lens (main meridian of progression, far vision region, near vision region, etc.), as well as the work carried out by the applicant to improve wearer comfort of such lenses.

Applicant has also proposed, in order to better satisfy the visual needs of long sighted people and to improve comfort of progressive multifocal lenses, to adapt the shape of the main meridian of progression, as a function of the power addition value A (French patent application FR-A-2,683, 642).

For such lenses, the power addition value A is defined as the variation in mean sphere between a reference point in the far vision region and a reference point in the near vision region.

Such progressive lenses are generally prescribed as a function of the wearer's ametropia and the power needed for near vision.

Lenses also exist which are more specifically dedicated to near vision; such lenses do not have a a far vision region with a defined reference point like conventional progressive lenses have. Such lenses are prescribed depending on the near vision power the wearer needs, independently of the far vision power. Such a lens is described in an article in the "*Opticien Lunetier*" dated April 1988, and is sold commercially by the applicant under the Essilor Delta trademark; this lens is also as simple to use and easy to wear as a progressive lens, and it is attractive to long-sighted people not fitted with progressive lenses. This lens is also described in French patent application FR-A-2,588,973. It has a central portion which is equivalent to the single-focus lens that would normally have been employed for correcting longsightedness, in order to ensure satisfactory near vision. It additionally has a slight decrease in power in the upper portion, ensuring that the wearer also has sharp vision beyond the usual near vision field. Finally, the lens has a point at a power value equal to the nominal power for near vision, a higher power region at the lower portion of the lens, and a lower powered region in the top portion of the lens.

Existing multifocal lenses, whether they be progressive or dedicated to near vision can still be further improved as regards their foveal vision performance, in order to improve wearer comfort. Wearers of multifocal lenses do in fact sometimes feel uncomfortable with dynamic vision. Such lenses can also be improved by preserving a near vision region that is sufficiently high to ensure optimum wearer comfort; finally, it is important that wide visual fields be provided in near, intermediate and far vision.

SUMMARY OF THE INVENTION

The present invention provide a multifocal lens which overcome the disadvantages of prior art lenses and which provides wearers with improved peripheral vision while still ensuring foveal vision is good, thereby ensuring ease of adaptation of wearers to their lenses. The invention nevertheless ensures rapid progression of mean sphere, ensuring the presence of a large near vision region. It also provides balanced distribution of isosphere and isocylinder lines.

The invention provides a multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions, in which a principal length of progression, defined as a ratio between power addition and maximum slope of mean sphere along said meridian is less than 16 mm;

in which sphere varies in a monotonous fashion as a function of angle on a 20 mm radius circle centered on a geometric center of the lens at both sides of said meridian, and in which the far vision region delimited in an upper portion of said lens by lines formed of points for which cylinder is equal to half power addition includes an angular sector having its origin at the geometric center of the lens with an included angle greater than 150°.

The principle length of progression can preferably fall within ranges that have about 15 mm, about 14 mm, or about 13 mm as an upper limit. The lower limit for such ranges can be, for example, about 12 mm, about 11 mm, or about 10 mm. Most preferably, the principle length of progression is about 12 mm, i.e., in the range of about 12 to 13 mm.

Advantageously, the main meridian of progression is made up by mid-points of horizontal segments joining respective lines formed by points where cylinder is 0.50 diopter.

In one embodiment, the near vision region, delimited in an upper portion of said lens by lines formed by points where cylinder is equal to half power addition has a width that is greater than 12 mm at a point of reference for near vision.

In another embodiment, said included angle has a value comprised between 160° and 170°, preferably of the order of 165°.

Preferably, the modulus of the derivative $dS/d\Theta$ of mean sphere with respect to angle on said circle is comprised between 0.005 and 0.015 when said angle $\Theta$ is comprised in the ranges [30°; 100°] and [270°; 325°].

Advantageously, the modulus of the derivative $dS/d\Theta$ of mean sphere with respect to angle on said circle is comprised between 0.01 and 0.04 when said angle $\Theta$ is comprised in the ranges [125°; 187°] and [187°; 250°].

In one embodiment, the lens is a multifocal lens dedicated to near vision and intermediate vision, said lens having a power addition defined as a difference between maximum and minimum values of mean sphere on said meridian of progression, inside a 20 mm radius circle centered on the geometric center of said lens.

In another embodiment, the lens is a progressive multifocal lens having a reference point for a near vision region, a reference point for a far vision region, and a power addition defined as a difference between the values of mean sphere at these two points.

Further features and advantages of the present invention will become more clear from the description which follows of one embodiment of the invention provided by way of non-limiting example with reference to the attached drawings.

DETAILED DESCRIPTION OF PREFERRED EMBODIMENT

Below, we shall employ an orthonormal coordinate system in which the x-axis corresponds to the horizontal axis of the lens and the y-axis corresponds to the vertical axis; the centre 0 of the reference frame is the geometric center of the lens.

Figure 1:
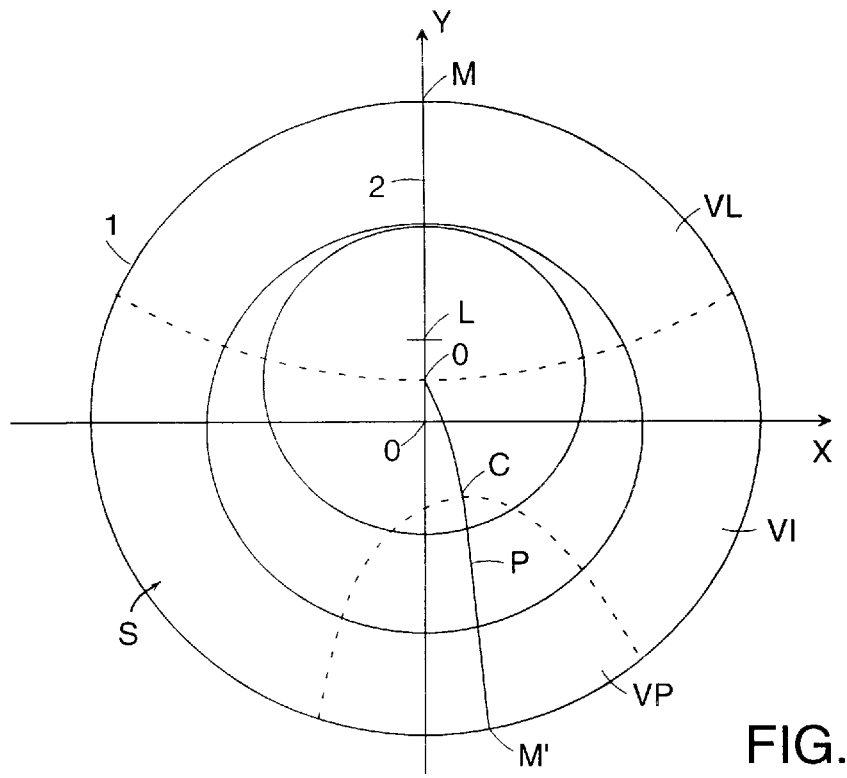
FIG. 1 is a diagrammatical front view of a multifocal progressive lens.

FIG. 1 is a diagrammatical front view of a known progressive ophthalmic lens, showing the various elements thereof.

FIGS. 2 to 6 show the optical characteristics of the lens according to the invention, this lens having a diameter of about 60 mm. In FIGS. 2 to 6, we have described a lens having a power addition of one diopter.

FIGS. 7 to 12 show a similar view, for lenses having a power addition of 2 or 3 diopters.

With reference to FIG. 1, the various elements of a multifocal ophthalmic lens will now be described. Such a lens generally has an aspherical face shown in FIG. 1 and a second face which can be aspherical or toroidal.

For every point on the aspherical surface, a mean sphere D is defined from the formula:

$$D = \frac{n-1}{2}\left(\frac{1}{R_1} + \frac{1}{R_2}\right)$$

in which:

$R_1$ and $R_2$ are the maximum and minimum radii of curvature expressed in meters, and n is the refractive index of the lens material.

Cylinder C is defined by the formula:

$$C = (n-1)\left|\frac{1}{R_1} - \frac{1}{R_2}\right|$$

Isosphere lines are lines constituted by the projection onto a plane tangential to the progressive surface at the geometric centre O of points on the lens surface having the same value of mean sphere. Similarly, isocylinder lines are lines constituted by the projection onto this same plane of points having the same cylinder.

Conventionally, the lens 1 comprises in its upper portion a far vision region VL, in its lower portion a near vision region VP and, between these two regions, an intermediate region VI. For a progressive lens, a reference point P is defined in the near vision region at which near vision is measured and a reference point L at which far vision is measured. For a lens dedicated to near vision, a reference point P is defined in the near vision region for measuring near vision; however, no corresponding reference point is defined for the far vision region.

On FIG. 1, the main meridian of progression 2 of the lens is shown, passing through the far vision region, the intermediate vision region and the near vision region. This meridian is defined as the locus of the mid-points of horizontal segments delimited by the 0.50 diopter isocylinder line. In the example of FIG. 1, the meridian is essentially composed of three segments, the first one extending substantially vertically from the top of the lens, passing through the point L, down to a point D, referred to as the fitting centre, and located between the far vision control point L and the geometric centre O. The second segment extends from point D obliquely towards the nasal side of the lens, and the third segment starts from the end C of the second segment and passes through the near vision control point P. Other forms of meridian are possible.

In the case of progressive multifocal ophthalmic lenses, a power addition is defined in a manner known per se, this being the difference in mean sphere between a reference point P in the near vision region and a reference point L in the far vision region.

For multifocal lenses dedicated to near vision and intermediate vision, minimum and maximum values of sphere are measured on the meridian thus defined within the bounds of a 20 mm radius circle centered on the geometric center of the lens. The power addition is now the difference between these minimum and maximum values of sphere; this definition is substantially equivalent, for progressive lenses, to the conventional definition of power addition and being the difference in sphere between the reference points for near and far vision.

With these definitions, it is generally considered that the limit of the far vision region in the upper portion of the lens is formed by isocylinder lines of a value equal to half the power addition. Similarly, the limit of the near vision region in the lower portion of the lens is set by isocylinder lines of a value equal to half the power addition.

The inner circle shown on FIG. 1. represents the region scanned by the eye when performing everyday tasks. The size and position of this portion, known as the foveal vision region has been determined by numerous series of measurements carried out in the applicant's laboratories; reference can example be made to IEEE, Portable eye movement recorder by T. Bonnin and N. Bar, Proceedings of the 14th annual international conference of the IEEE Engineering in Medicine and Biology Society 1992, part 4, pages 1668 to 1669, to AAO 1993, to "Optimization of ophthalmic aspheric lenses: recording of eye movement for everyday tasks", N. Bar, T. Bonnin and C. Pedreno, Optometry and vision science 1993, No. 12s, volume 70 page 154, or yet again to ECEM 93, "The use of visual space", a poster by N Bar. This region covers a 30 mm diameter disc centered on the mounting center.

To ensure maximum visual comfort for the wearer, we consider the 40 mm diameter disc centered on the geometric center of the lens, which encompasses the foveal vision region and we have set out to limit tangential variations in sphere along this circle. Controling variations in sphere along this circle makes it possible to master deformations in the optical characteristics of the multifocal surface; the wearer's peripheral vision is thus improved. It is also desirable to maintain a sufficiently wide visual field in the foveal vision region. The present invention makes it possible to obtain a balanced distribution of the isosphere and isolcylinder lines; The relevant circle is also shown on FIG. 1.

In prior art lenses, and in particular in the case of the applicant's lenses, vision in the region around the main meridian of progression is completely satisfactory.

In order to improve the gentleness of progression of the lenses, and comfort in the foveal vision region, the present invention and sets out to consider a new definition of the characteristics of the lens surface, explained with reference to the following figures. The figures cover the case of progressive multifocal lenses; the invention applies *mutatis mutandis* to multifocal lenses dedicated to near vision.

Figure 2:
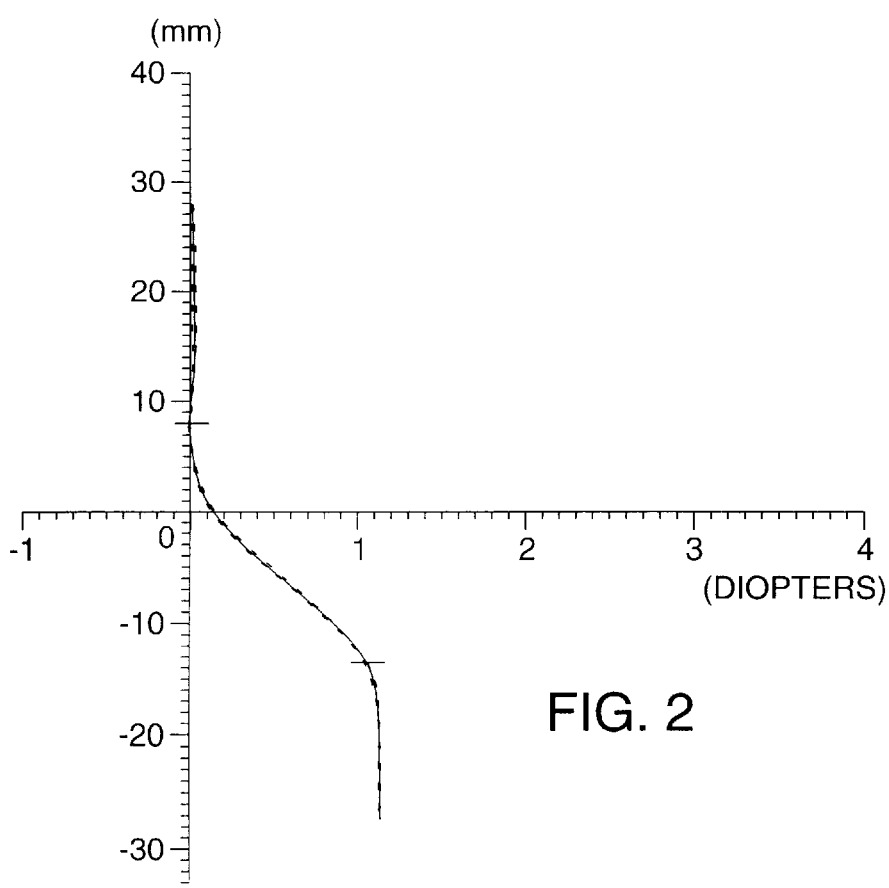
FIG. 2 shows graphically variation in power along the meridian of the lens according to the invention.

FIG. 2 is a a graph showing power along the meridian of the lens according to the intervention, the power addition of this lens being one diopter. The y-axis coordinates of the graph of FIG. 1 are the y-axis coordinates on the lens; the x-axis coordinates give the difference in power, in diopters, from the reference point in the far vision region.

The point having the value y=8 mm on the y-axis along the meridian corresponds to the reference point L for far vision, which, in the case of FIG. 2, is the point of minimum sphere; at this point, mean sphere is 5.2 diopters and cylinder is 0; the point having a y-axis value of 14 mm on the meridian is the reference point P for near vision; at this point, mean sphere is 6.22 diopters and cylinder is 0.02 diopters.

A principal length of progression is defined as the ratio between power addition A as defined above and the maximum value of the slope of mean sphere along the meridian; this ratio is written as:

$$L_{pp}=A/P_{mer}$$

For a progressive multifocal lens, we have:

$$L_{pp}=(S_{VP}-S_{VL})/P_{mer}$$

where $S_{VP}$ and $S_{VL}$ are respectively the values of mean sphere at the near and far vision control points and $P_{mer}$ is the maximum value of the slope of sphere along the meridian; this slope of sphere corresponds to the maximum modulus of the gradient of sphere with respect to x or to y.

For a progressive multifocal lens dedicated to near and intermediate vision, we have:

$$L_{pp}=(S_{max}-S_{min})/P_{mer}$$

where $S_{max}$ and $S_{min}$ are respectively the maximum and minimum values of sphere on the meridian, and $P_{mer}$ is as defined above.

This ratio is equivalent to a length, and represents the length over which mean sphere increases by a value corresponding to power addition.

FIG. 2 shows that, at first, sphere remains substantially constant in the far vision region above point L. It shows also that sphere remains substantially constant in the near vision region, around point P. Finally, it shows that the principal length of progression, equal to 12.50 mm, is low, and is thus less than 16 mm. This ensures satisfactory near vision in a region extending above the near vision control point, obviating the need for the wearer to move his head. Comfortable and extensive near vision is thereby ensured. Maximum slope of sphere on the meridian is 0.08 diopters per mm.

Figure 3:
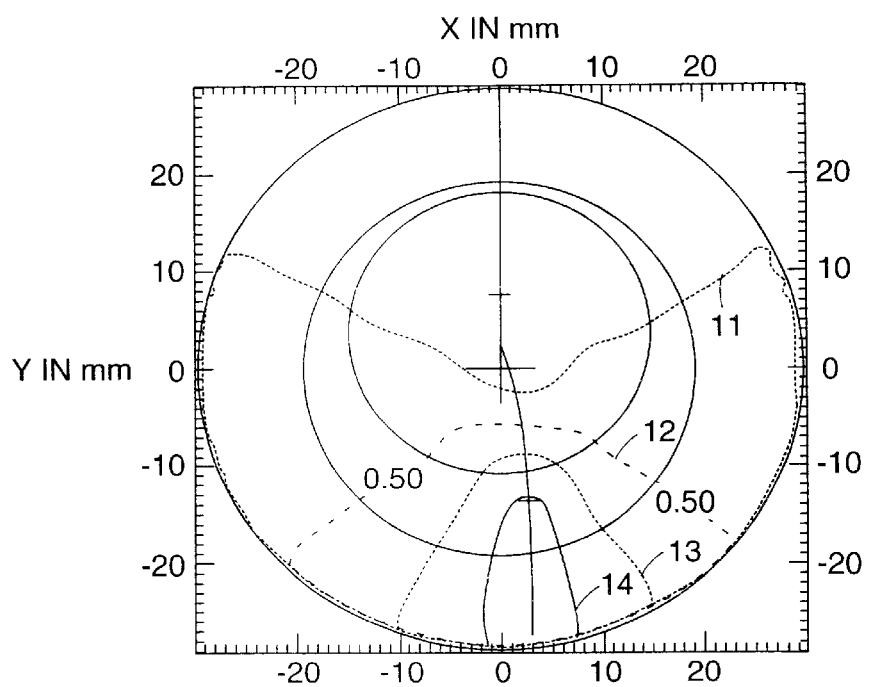
FIG. 3 is a front view of the lens in FIG. 2, showing the main meridian of progression and lines indicating the level of mean sphere.

FIG. 3 is a front view of the lens in FIG. 2, showing the main meridian of progression and lines of equal mean sphere. Those elements shown on FIG. 2 will be found also in FIG. 3 with the addition of isosphere lines. The isosphere lines in FIG. 3 are the lines 11, 12, 13 and 14 representing respectively mean sphere which is greater by 0.25, 0.5, 0.75 or 1 diopter to mean sphere at the far vision control point L. Finally, a 40 mm diameter circle centered on the geometric center of the lens is shown.

Figure 4:
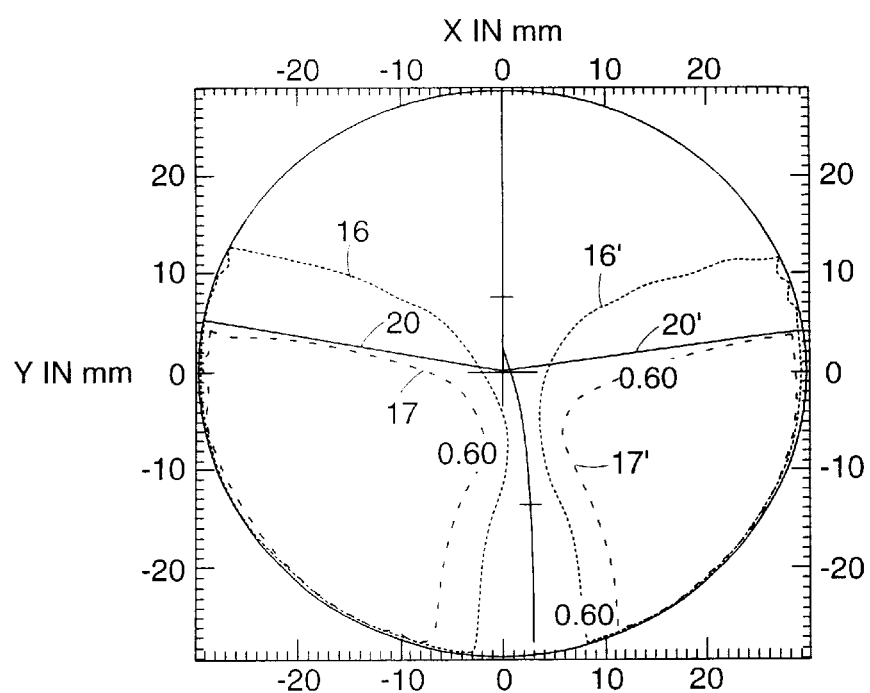
FIG. 4 is a front view of the lens in FIG. 2, showing the main meridian of progression and lines indicating cylinder level.

FIG. 4 is a front view of the lens in FIG. 2, showing the main meridian of progression and lines of equal cylinder. Those elements shown in FIG. 2 are also present in FIG. 4. As cylinder is low along the main meridian of progression, there are two isocylinder lines for each value of cylinder. The isocylinder lines in FIG. 4 are the lines 16 and 16', and 17 and 17', representing, respectively, a cylinder of 0.25, and 0.50 diopters.

As indicated above, in the upper portion of the lens the border of the far vision region is substantially constituted by the 0.5 isocylinder lines 17 and 17'. The lens of the invention thus has a wide far vision region which extends over almost all of the top half of the lens. Quantitatively, the far vision region includes an angular sector defined by two half-lines 20 and 21' originating from the geometric center of the lens with an included angle greater than 130°; in FIG. 4, the angle between the half-lines 20 and 20' is of the order of 160°.

In the lower portion of the lens, the border of the near vision region is also substantially constituted by the 0.5 isocylinder lines 17 and 17'.

Figure 5:
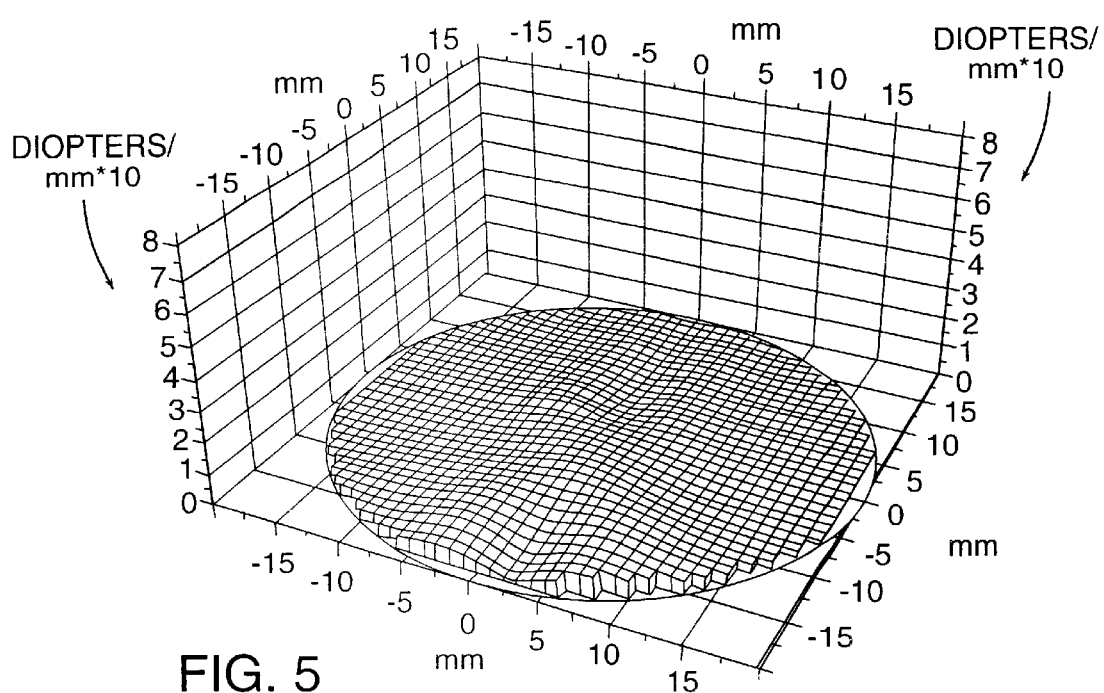
FIG. 5 is a three-dimensional view of the slopes of sphere on the lens of FIG. 2.

FIG. 5 is a three-dimensional representation of slopes of sphere on the lens of FIG. 2; FIG. 5 shows the slope of mean sphere, in diopters per mm, as a function of position on the lens, in the reference frame defined above.

Figure 6:
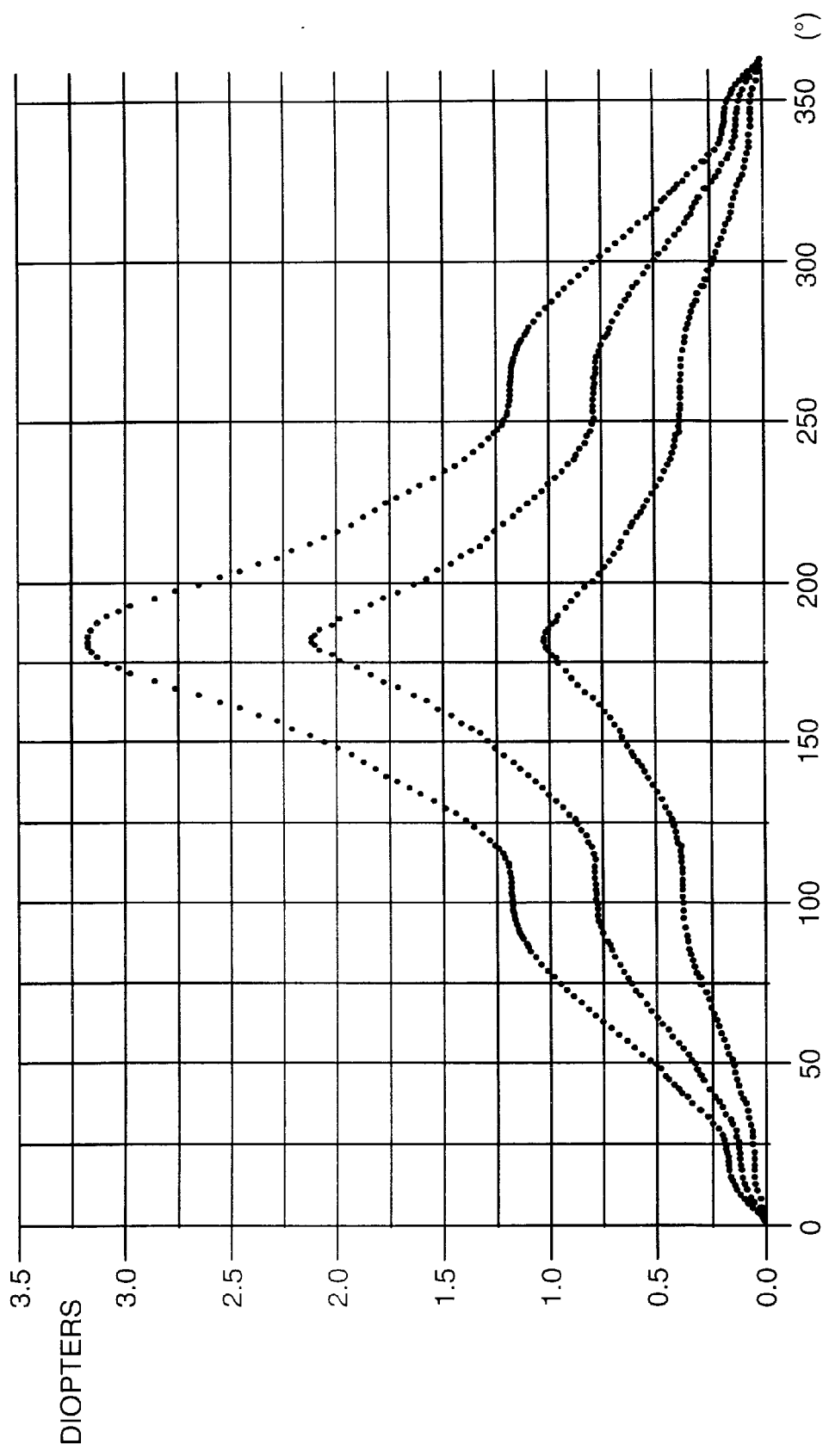
FIG. 6 shows, diagrammatically, sphere on the 20 mm radius circle centered on the geometric center of the lens, as function of angle for the lens in FIG. 2 and for the lens in FIGS. 7 to 12.

FIG. 6 shows variation in mean sphere on the 40 mm diameter circle centered on the geometric center of the lens for various values of power addition; the y axis is graduated in diopters and the x axis shows the angle θ in a system of polar coordinates the center of which is the geometric center of the lens and the angles of which are measured starting from an upwardly-directed vertical half-line originating from the geometric center of the lens; in other words, the x-axis represents the angle θ between, firstly, an upwardly-directed vertical half-line originating from the geometric center of the lens and, secondly, a half-line originating from the geometric center of the lens and passing through the point on said circle where sphere is being measured. The lower curve in FIG. 6 corresponds to the variation in sphere on the 40 mm diameter circle for the one-diopter power addition lens shown in FIGS. 2 to 5; the middle and upper curves on FIG. 6 respectively show these same variations for lenses of power addition two and three diopters.

FIG. 6 shows that variations in sphere on the 20 mm radius circle centered on the geometric center of the lens is monotonous, when one moves on the circle from a point of intersection with the meridian to another point of intersection of the circle with the meridian.

Stated in other terms, on FIG. 6, the point of x-axis value 0° or 360° corresponds to the point having coordinates x=0 mm, y=20 mm in the orthonormal reference frame defined above, and also substantially corresponds to the point of intersection of the meridian and the circle, in the upper portion of the lens.

The point on the x-axis where 0=187° on FIG. 6 is the point for which sphere has a maximum value; this point corresponds to the intersection of the circle with the meridian in the lower portion of the lens, and has, in the orthonormal reference frame defined above, the coordinates x=3.47 mm and y=−19.70 mm.

When one moves around the circle from the point of angle 0=0° towards the point of angle 0=187°, sphere is an increasing function of angle; when one moves around the circle from the point of angle 0=187° towards the point of angle 0=0°, sphere is a decreasing function of angle.

This condition regarding monotonous variation of sphere over the circle at both sides of the meridian ensures there is very gentle and uniform progression of the optical characteristics of the lens, both inside the foveal region as well as outside it.

The lens in FIGS. 2 to 6 thus ensure progression is very gentle, ensuring much easier adaptation on the part of the wearer of the lenses.

Quantitatively, this is reflected by the following conditions:

(1) the far vision region comprises an angular sector with its origin at the geometric center of the lens, with an included angle of at least 150°;

(2) the principal length of progression i.e. the ratio between power addition and the maximum slope of mean sphere on the meridian is less than 16 mm, and (3) variation in sphere on the 20 mm radius circle centered on the geometric center of the lens is monotonous at both sides of the meridian.

Relation (1), as explained above, sets a lower limit for the surface of the far vision region.

Relation (2) reflect the fact that the principal length of progression of the lens is low, and thus the fact that the near vision region is sufficiently high on the lens to ensure optimum comfort for the wearer in near vision.

More particularly, the principle length of progression can preferably fall within ranges that have about 15 mm, about 14 mm, or about 13 mm as an upper limit. The lower limit for such ranges can be, for example, about 12 mm, about 11 mm, or about 10 mm. Most preferably, the principle length of progression is about 12 mm, i.e., in the range of about 12 to 13 mm.

The third relation ensures, through monotony of variations in mean sphere at the edge of the foveal region, and taking account of the continuity and derivability properties of the progressive surfaces, well known to those skilled in the art, good mastery of variations in optical parameters inside as well as outside this region.

The combination of these three conditions ensures a good distribution of the isosphere and isocylinder lines over the surface of the lens, thereby ensuring very gentle progression.

The combination of these three conditions is not satisfied by any of the prior art multifocal ophthalmic lenses tested by the applicant. The invention provides, for the first time, such a distribution of isocylinder and isosphere lines.

Figure 7:
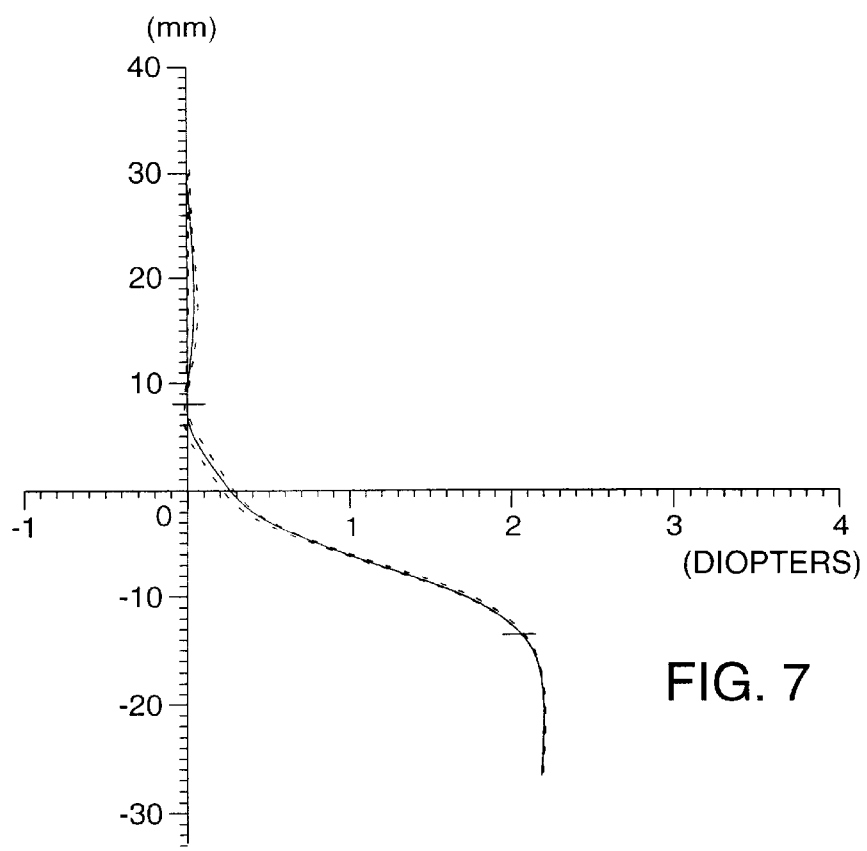
FIGS. 7 to 9 are similar views to those in FIGS. 2 to 4, for a power addition of 2 diopters.
Figure 8:
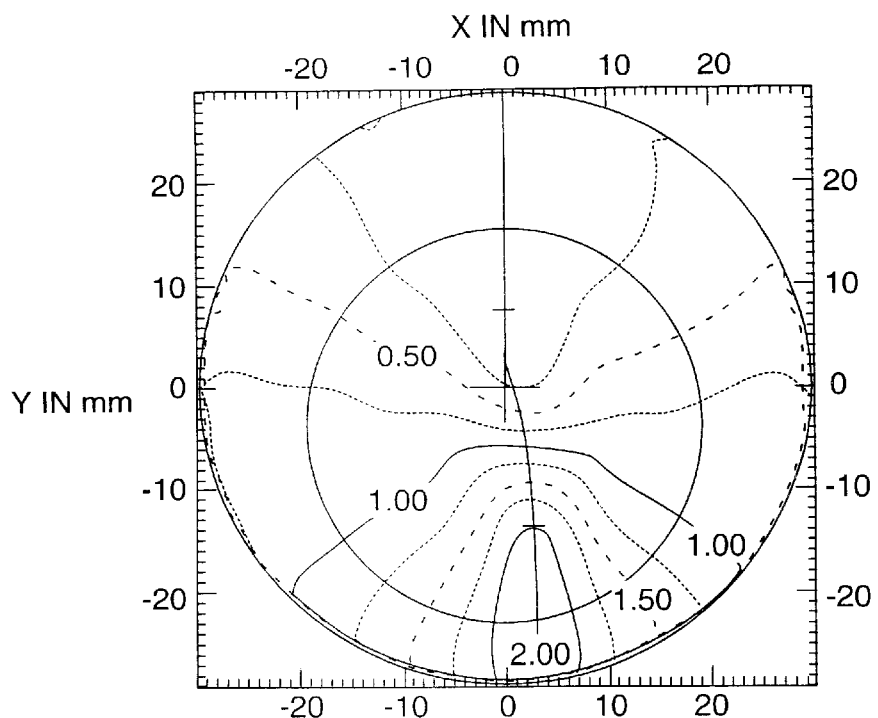
Figure 9:
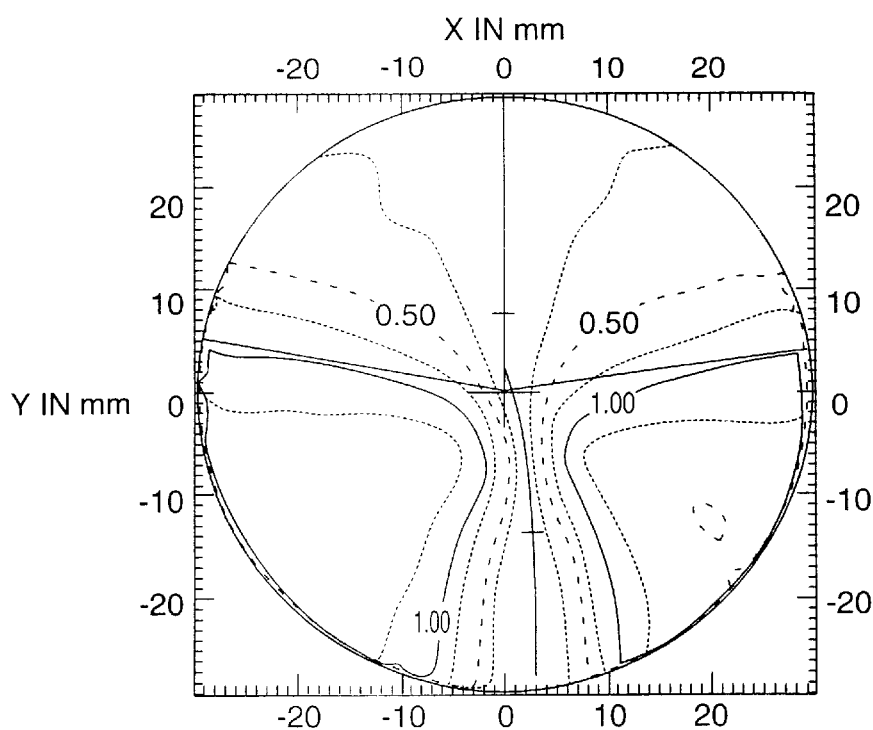
Figure 10:
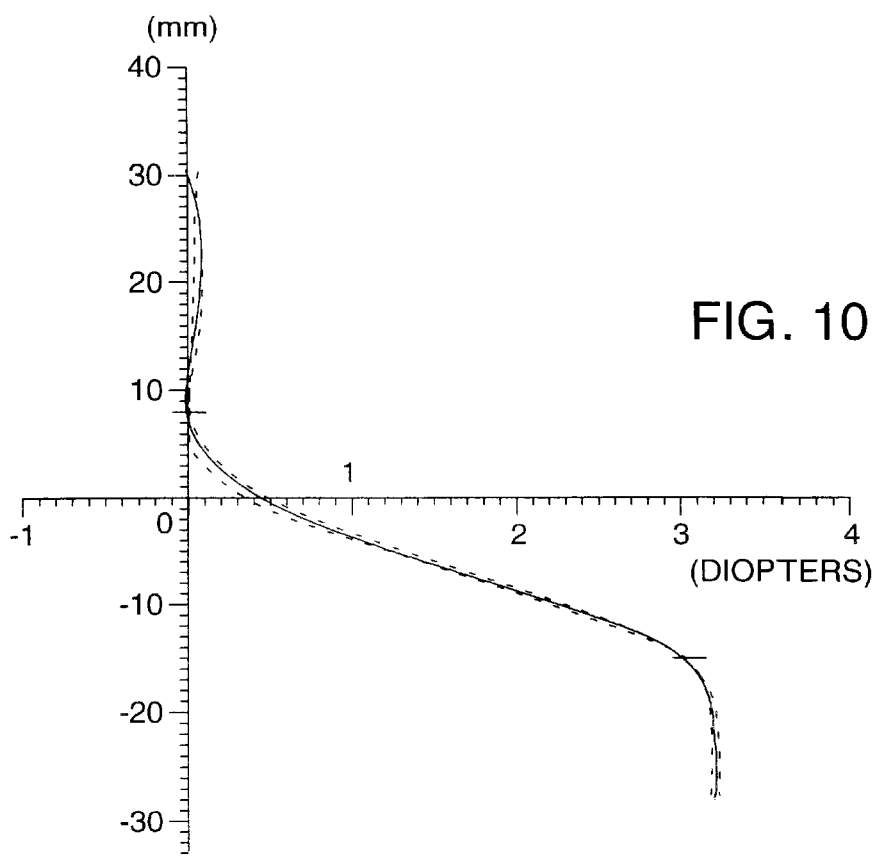
FIGS. 10 to 12 are similar views to those in FIGS. 2 to 4, for a power addition of 3 diopters.
Figure 11:
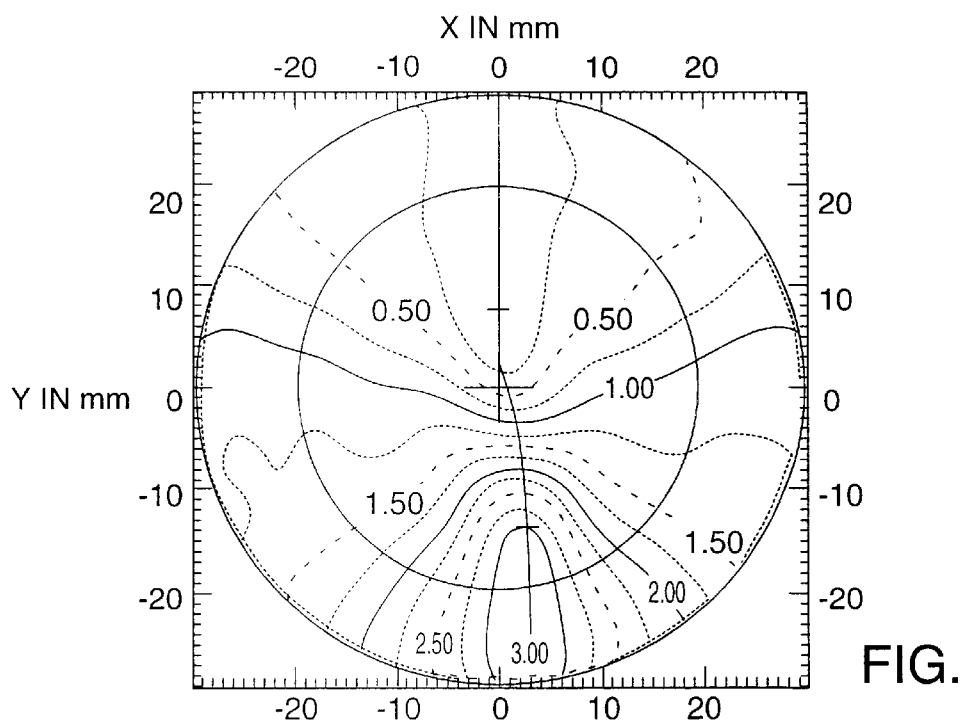
Figure 12:
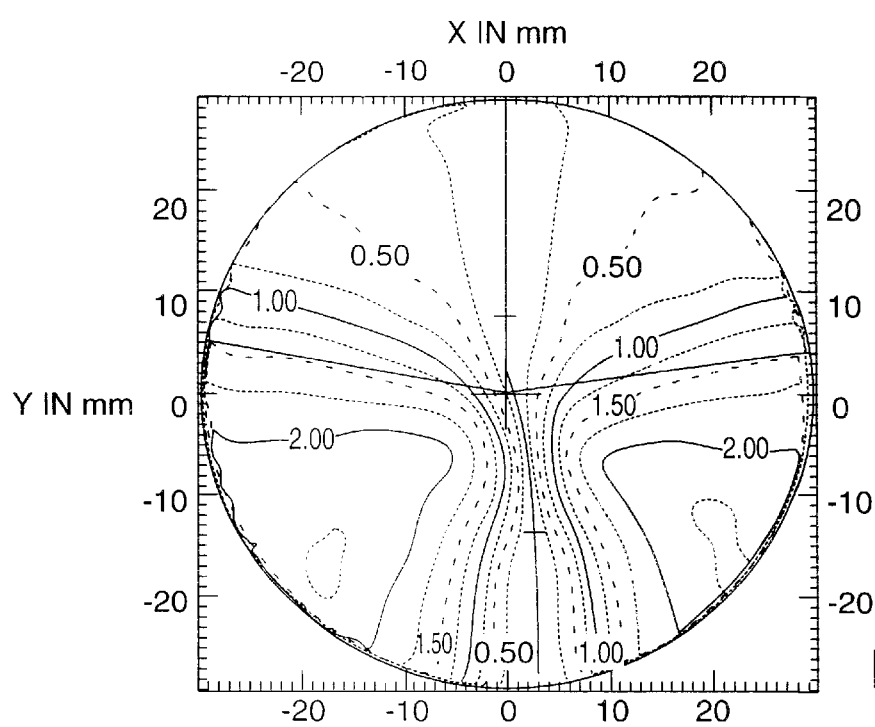

FIGS. 7 to 9 are similar views to those in FIGS. 2 to 4 but for a lens of power addition 2 diopters; FIGS. 10 to 12 are similar views to those in FIGS. 2 to 4, but for a lens of power addition 3 diopters. Isosphere lines with a 0.25 diopter step are shown on FIGS. 8 and 11; isocylinder lines in 0.25 diopter steps are shown on FIGS. 9 and 12. These diagrams also show the half-lines tangential to the A/2 isocylinder lines, in the far vision region.

For each of these lenses, the three conditions are satisfied. In the case of the lens in FIGS. 2 to 5, we have, as indicated above:

angle at the center of the angular sector included in the far vision region: 163°;

$L_{pp}$=12.50 mm.

For the lenses of power addition 2 and 3 diopters, the values of the angle at the center and the principal length of progression are the same.

The invention provides additional advantageous characteristics, which, combined with these three conditions, make it possible to improve the performance of the lens according to the invention.

According to the invention, the near vision region has, at the level of the reference point for near vision, a width of at least 12 mm, and preferably a width greater than 13 mm; this width is measured at the y-axis coordinate of point P, between the A/2 isocylinder lines, where A is the power addition as defined above. As can be seen on FIG. 3, in the case of a power addition of one diopter, the width of the near vision region is 13.5 mm. For a power addition of two or three diopters, this value remains substantially the same.

In one embodiment of the invention, the angle at the center of the angular sector contained in the far vision region is comprised between 160 and 170°, and is preferably near to 165°; in the example shown in the figures, this angle at the center is substantially 163° for the one diopter power addition lens, and is the same for the two or three diopter power addition lenses.

Advantageously, limits are also imposed on the slope of mean sphere on the 20 mm radius circle; this slope is in fact the derivative dS/dθ of the function represented on the curves of FIG. 6.

The table below gives average values for the absolute value of slope for different angles and for different power additions.

| power addition\ dS/dθ | 30–100° | 125–180° | 200–250° | 270–325° |
|---|---|---|---|---|
| one diopter | 0.005 | 0.012 | 0.013 | 0.005 |
| two diopters | 0.010 | 0.025 | 0.026 | 0.01 |
| three diopters | 0.015 | 0.036 | 0.040 | 0.015 |

In all cases, the absolute value of slope is comprised between 0.005 and 0.015 for values of angle 0 in [30°; 100] or [270°; 325°]; it is comprised between 0.01 and 0.04 for values of angle 0 in [125°; 180°] or [200°; 250°].

We shall now give details of the various characteristics that make it possible to provide the various lenses according to the invention. As known per se, the surface of the lenses is continuous and continually derivable three times. As known to those skilled in the art, the surface of progressive lenses is obtained by digital optimisation using a computer, setting limiting conditions for a certain number of lens parameters.

Combinations of the three conditions defined above, with, if appropriate, one or several of the other criteria defined above can be used as limiting conditions.

These criteria apply both for a conventional progressive multifocal lens with a reference point in the far vision region and a reference point in the near vision region, as well as for a multifocal lens that is dedicated to near vision.

One can advantageously start by defining, for each lens of the family, a main meridian of progression. For this, the teachings of French Patent Application FR-A-2,683,642 mentioned above, which is incorporated in its entirety herein by reference, is used. Any other definition of the main meridian of progression can be used, for applying the teaching of the invention.

Obviously, this invention is not limited to what has been described: among other things, the aspherical surface could be the surface facing the wearer of the lenses. Additionally, although there was no mention in the description of lenses which can be different for both eyes, this of course obviously applies.

What is claimed is:

1. A multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions,
   in which a principal length of progression, defined as a ratio between power addition and maximum slope of mean sphere along said meridian is less than 16 mm;
   in which sphere varies in a monotonous fashion as a function of angle on a 20 mm radius circle centered on a geometric center of the lens at both sides of said meridian,
   and in which the far vision region delimited in an upper portion of said lens by lines formed of points for which cylinder is equal to half power addition includes an angular sector having its origin at the geometric center of the lens with an included angle greater than 150°.

2. The lens according to claim 1, wherein said main meridian of progression is made up by mid-points of horizontal segments joining respective lines formed by points where cylinder is 0.50 diopter.

3. The lens according to claim 1, wherein said near vision region, delimited in a lower portion of said lens by lines formed by points where cylinder is equal to half power addition has a width that is greater than 12 mm at a point of reference for near vision.

4. The lens according to claim 1, wherein said included angle has a value comprised between 160° and 170°.

5. The lens according to claim 4, wherein said included angle has a value of the order of 165°.

6. The lens according to claim 1, wherein a modulus of the derivative $dS/d\theta$ of mean sphere with respect to angle on said circle is comprised between 0.005 and 0.015 when said angle $\theta$ is comprised in the ranges [30°; 100°] and [270°; 325°].

7. The lens according to claim 1, wherein a modulus of the derivative $dS/d\theta$ of mean sphere with respect to angle on said circle is comprised between 0.01 and 0.04 when said angle $\theta$ is comprised in the ranges [125°; 187°] and [187°; 250°].

8. The lens according to claim 1, wherein the lens is a multifocal lens dedicated to near vision and intermediate vision, said lens having a power addition defined as a difference between maximum and minimum values of mean sphere on said meridian of progression, inside a 20 mm radius circle centered on a geometric center of said lens.

9. The lens according to claim 1, wherein said lens is a progressive multifocal lens having a reference point for a near vision region, a reference point for a far vision region, and a power addition defined as a difference between the values of mean sphere at these two points.

10. A multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions,
    in which a principal length of progression, defined as a ratio between power addition and maximum slope of mean sphere along said meridian is less than 13 mm;
    in which sphere varies in a monotonous fashion as a function of angle on a 20 mm radius circle centered on a geometric center of the lens at both sides of said meridian,
    and in which the far vision region delimited in an upper portion of said lens by lines formed of points for which cylinder is equal to half power addition includes an angular sector having its origin at the geometric center of the lens with an included angle greater than 150°.

11. The lens according to claim 10, wherein said main meridian of progression is made up by mid-points of horizontal segments joining respective lines formed by points where cylinder is 0.50 diopter.

12. The lens according to claim 10, wherein said near vision region, delimited by lines formed by points where cylinder is equal to half power addition has a width that is greater than 12 mm at a point of reference for near vision.

13. The lens according to claim 10, wherein said included angle has a value comprised between 160° and 170°.

14. The lens according to claim 13, wherein said included angle has a value of the order of 165°.

15. The lens according to claim 10, wherein a of the derivative $dS/d\theta$ of mean sphere with respect to angle on said circle is comprised between 0.005 and 0.015 when said angle $\theta$ is comprised in the ranges [30°; 100°] and [270°; 325°].

16. The lens according to claim 10, wherein a modulus of the derivative $dS/d\theta$ of mean sphere with respect to angle on said circle is comprised between 0.01 and 0.04 when said angle $\theta$ is comprised in the ranges [125°; 187°] and [187°; 250°].

17. The lens according to claim 10, wherein the lens is a multifocal lens dedicated to near vision and intermediate vision, said lens having a power addition defined as a difference between maximum and minimum values of mean sphere on said meridian of progression, inside a 20 mm radius circle centered on a geometric center of said lens.

18. The lens according to claim 10, wherein said lens is a progressive multifocal lens having a reference point for a near vision region, a reference point for a far vision region, and a power addition defined as a difference between the values of mean sphere at these two points.

19. A multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions,
    in which a principal length of progression, defined as a ratio between power addition and maximum slope of mean sphere along said meridian is in the range of about 12 to 13 mm;
    in which sphere varies in a monotonous fashion as a function of angle on a 20 mm radius circle centered on a geometric center of the lens at both sides of said meridian, and in which the far vision region delimited in an upper portion of said lens by lines formed of points for which cylinder is equal to half power addition includes an angular sector having its origin at the geometric center of the lens with an included angle greater than 150°.

20. The lens according to claim 19, wherein said main meridian of progression is made up by mid-points of horizontal segments joining respective lines formed by points where cylinder is 0.50 diopter.

21. The lens according to claim 19, wherein said near vision region, delimited by lines formed by points where cylinder is equal to half power addition has a width that is greater than 12 mm at a point of reference for near vision.

22. The lens according to claim 19, wherein said included angle has a value comprised between 160° and 170°.

23. The lens according to claim 22, wherein said included angle has a value of the order of 165°.

24. The lens according to claim 19, wherein a modulus of the derivative $dS/d\theta$ of mean sphere with respect to angle on said circle is comprised between 0.005 and 0.015 when said angle $\theta$ is comprised in the ranges [30°; 100°] and [270°; 325°].

25. The lens according to claim 19, wherein a modulus of the derivative $dS/d\theta$ of mean sphere with respect to angle on said circle is comprised between 0.01 and 0.04 when said angle $\theta$ is comprised in the ranges [125°; 187°] and [187°; 250°].

26. The lens according to claim 19, wherein the lens is a multifocal lens dedicated to near vision and intermediate vision, said lens having a power addition defined as a difference between maximum and minimum values of mean sphere on said meridian of progression, inside a 20 mm radius circle centered on a geometric center of said lens.

27. The lens according to claim 19, wherein said lens is a progressive multifocal lens having a reference point for a near vision region, a reference point for a far vision region, and a power addition defined as a difference between the values of mean sphere at these two points.

28. The lens according to claim 19, wherein the principal length of progression is about 12.5 mm.

* * * * *

UNITED STATES PATENT AND TRADEMARK OFFICE
CERTIFICATE OF CORRECTION

PATENT NO.   : 6,540,354 B2
DATED        : April 1, 2003
INVENTOR(S)  : Sandrine Francois et al.

It is certified that error appears in the above-identified patent and that said Letters Patent is hereby corrected as shown below:

Title page,
Item [56], Foreign Application Priority Data, after "Oct. 16, 1997 (FR) ... 97" insert a space between "12" and "989"
Item [57], ABSTRACT,
Line 2, insert -- , -- after "near vision region"

Drawings,
Figure 1, insert -- Prior Art --

Column 1,
Line 4, insert -- which was -- before "filed Jul. 17, 1998"
Lines 4 and 5, delete "now abandoned" and then insert -- and claims priority to French Patent Application 97 12 989 filed October 16, 1997 --
Line 20, replace "which is incorporated herein by reference" with -- which is incorporated herein by reference --
Line 41, delete "a" after "have"
Line 63, delete "," after "in order"

Column 2,
Lines 41 and 42, delete "in an upper portion of said lens"

Column 5,
Line 31, delete "a" after "is"

Column 8,
Line 54, insert -- º -- after "100"

Signed and Sealed this

Fourth Day of November, 2003

JAMES E. ROGAN
*Director of the United States Patent and Trademark Office*